(12) United States Patent
Graham et al.

(10) Patent No.: US 9,686,100 B2
(45) Date of Patent: Jun. 20, 2017

(54) PACKET ENCAPSULATION WITH REDIRECTED DMA FOR SOFTWARE DEFINED NETWORKS

(71) Applicant: International Business Machines Corporation, Armonk, NY (US)

(72) Inventors: Charles S. Graham, Rochester, MN (US); Nicholas J. Rogness, Rochester, MN (US); Steven E. Royer, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 14/316,944

(22) Filed: Jun. 27, 2014

(65) Prior Publication Data

US 2015/0381491 A1 Dec. 31, 2015

(51) Int. Cl.
*H04L 12/741* (2013.01)
*H04L 12/775* (2013.01)
*H04L 12/46* (2006.01)

(52) U.S. Cl.
CPC .......... *H04L 12/4633* (2013.01); *H04L 45/58* (2013.01); *H04L 45/745* (2013.01); *H04L 2212/0025* (2013.01)

(58) Field of Classification Search
None
See application file for complete search history.

(56) References Cited

U.S. PATENT DOCUMENTS

| | | |
|---|---|---|
| 6,725,284 B2 | 4/2004 | Arndt |
| 7,478,138 B2 | 1/2009 | Chang et al. |
| 7,813,369 B2 | 10/2010 | Blackmore et al. |
| 7,941,568 B2 | 5/2011 | Arndt et al. |
| 8,023,417 B2 | 9/2011 | Blackmore et al. |
| 8,996,840 B2 | 3/2015 | Auernhammer et al. |
| 2012/0151473 A1 | 6/2012 | Koch et al. |

FOREIGN PATENT DOCUMENTS

WO 2013081620 A1 6/2013

OTHER PUBLICATIONS

U.S. Appl. No. 14/525,605, entitled "Packet Encapsulation With Redirected DMA for Software Defined Networks", filed Oct. 28, 2014.
List of IBM Patents or Patent Applications Treated As Related.

*Primary Examiner* — Idriss N Alrobaye
*Assistant Examiner* — Dayton Lewis-Taylor
(74) *Attorney, Agent, or Firm* — Patterson + Sheridan, LLP

(57) ABSTRACT

A method, system, and computer program product for encapsulating a packet within a virtualized network. The method includes writing one or more first translation control entries (TCEs) from a TCE table of a client system to a TCE table of a host system, and writing one or more second TCEs to the TCE table of the host system. The first TCEs indicate a location within the client system of payload data for the packet, and the second TCEs indicate a location within the host system of at least one of header and footer information to be included with the payload data.

20 Claims, 7 Drawing Sheets

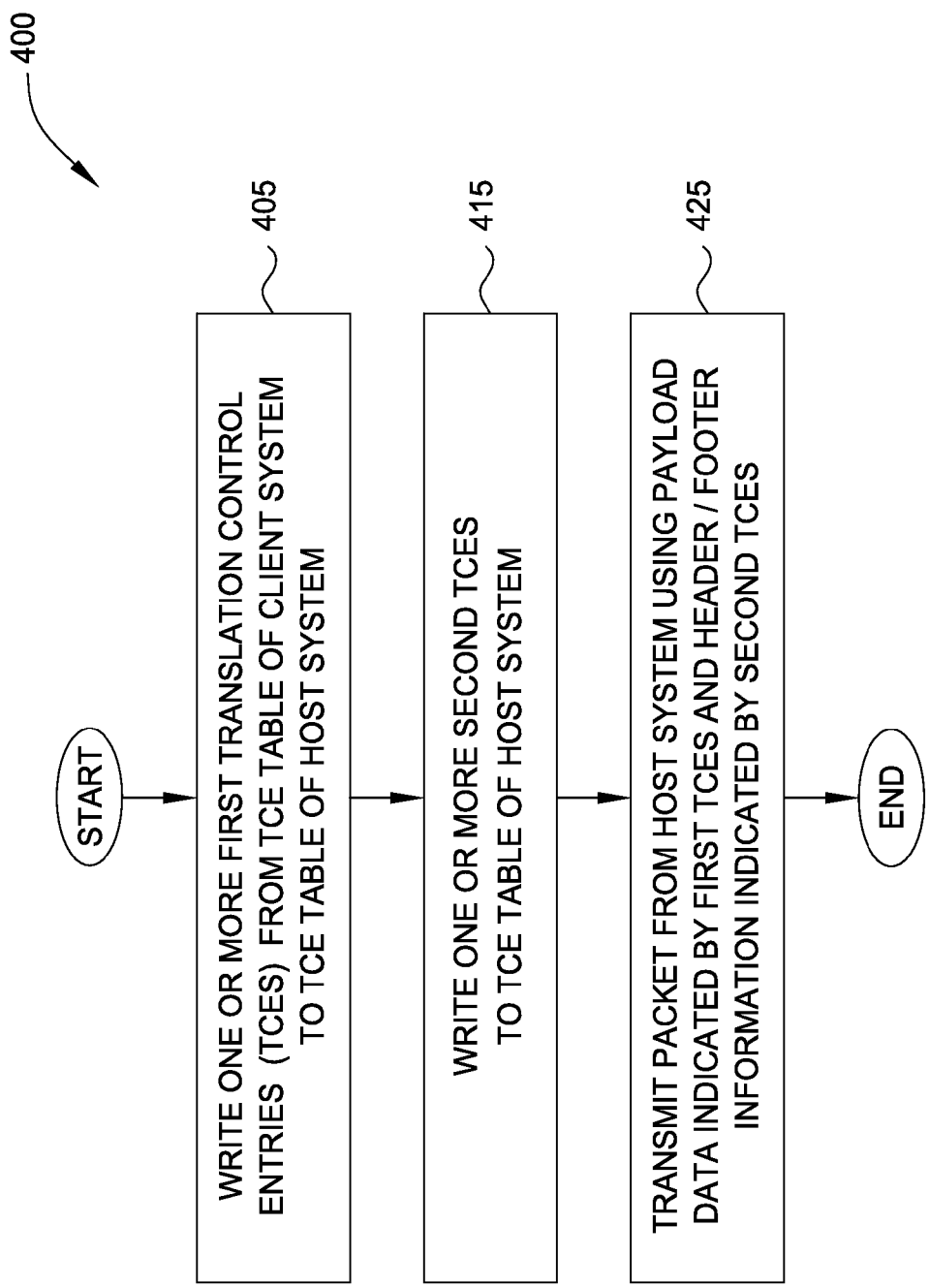

PACKET ENCAPSULATION WITH REDIRECTED DMA FOR SOFTWARE DEFINED NETWORKS

BACKGROUND

The present invention relates to communications in packet-based networks, and more specifically, to encapsulating packets transmitted on virtual networks.

Traditionally, transmitting data between virtual client devices on virtual networks requires copying the data from the sending virtual client to a host device. The host device performs the encapsulation of the data before transmitting the data out on the physical network using a physical input/output (I/O) adapter, such as a network adapter. The transmitted packets are received at various other physical I/O adapters, which route the packet data to the destination virtual client.

SUMMARY

According to one embodiment, a method is provided for encapsulating a packet within a virtualized network. The method includes writing one or more first translation control entries (TCEs) from a TCE table of a client system to a TCE table of a host system, and writing one or more second TCEs to the TCE table of the host system. The first TCEs indicate a location within the client system of payload data for the packet, and the second TCEs indicate a location within the host system of at least one of header and footer information to be included with the payload data.

According to one embodiment of the present invention, a computer readable medium is provided. The computer readable medium contains a program which, when executed, performs an operation that includes writing one or more first translation control entries (TCEs) from a TCE table of a client system to a TCE table of a host system, wherein the first TCEs indicate a location within the client system of payload data for the packet. The operation further includes writing one or more second TCEs to the TCE table of the host system, wherein the second TCEs indicate a location within the host system of at least one of header and footer information to be included with the payload data.

According to one embodiment of the present invention, a system is provided that includes a host system coupled to a physical network, and a client system using a virtualized computing resource provided by the host system. The system encapsulates a packet by performing an operation that includes writing one or more first translation control entries (TCEs) from a TCE table of the client system to a TCE table of the host system, wherein the first TCEs indicate a location within the client system of payload data for the packet. The operation further includes writing one or more second TCEs to the TCE table of the host system, wherein the second TCEs indicate a location within the host system of at least one of header and footer information to be included with the payload data.

BRIEF DESCRIPTION OF THE SEVERAL VIEWS OF THE DRAWINGS

So that the manner in which the above recited aspects can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 illustrates a method for encapsulating and transmitting a packet within a virtualized network, according to one embodiment.

Figure 1:
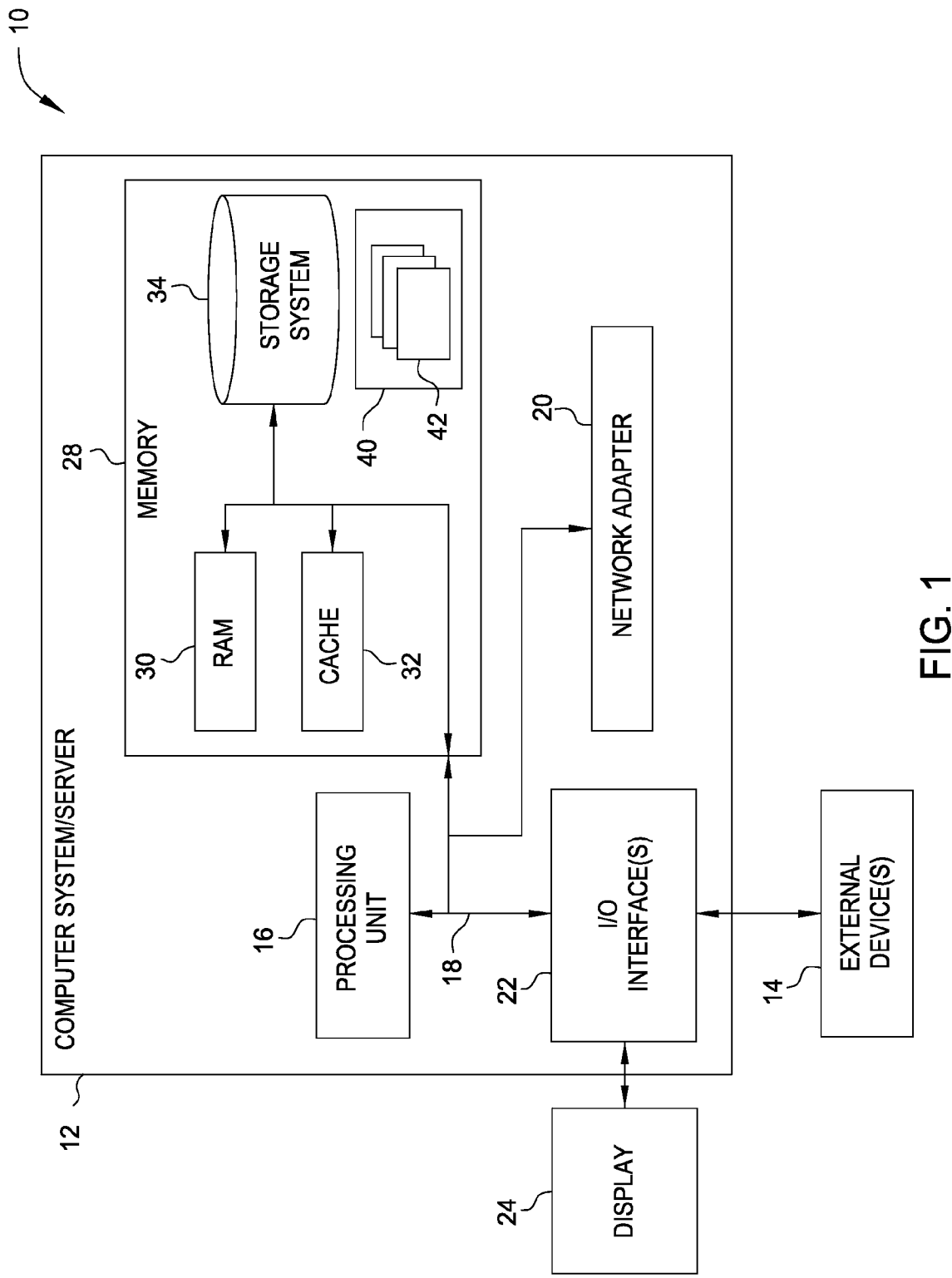
FIG. 1 depicts a cloud computing node, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Within a virtualized network environment, certain virtual client systems may not "own" a physical input/output (I/O) adapter that is capable of sending and receiving packets on a physical network. To establish communications between such virtual clients, network traffic may be routed through one or more host devices that include a physical I/O adapter. However, the routing process may be relatively inefficient as packets are copied using direct memory access (DMA) from the memory of the virtual client to the memory of the host device, and the portions of host device memory storing packet data are mapped into the translation table (such as a translation control entry table, or TCE table) of the physical I/O adapter. In such a case, the host device must perform additional processing to copy the packets and must provide sufficient memory to store the entire packets that await transmission onto the physical network.

In this disclosure, TCEs may be "redirected" from the virtual I/O adapter of the virtual client onto the TCE table of a physical I/O adapter of the host system. By using the redirected TCEs, the physical I/O adapter may perform a single direct memory access (DMA) to transmit packet payload data stored on the virtual client system. The payload data may be sent out to the physical network along with header and footer data provided by the host system, and may avoid the processing and storage requirements associated with intermediate packet copying steps.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
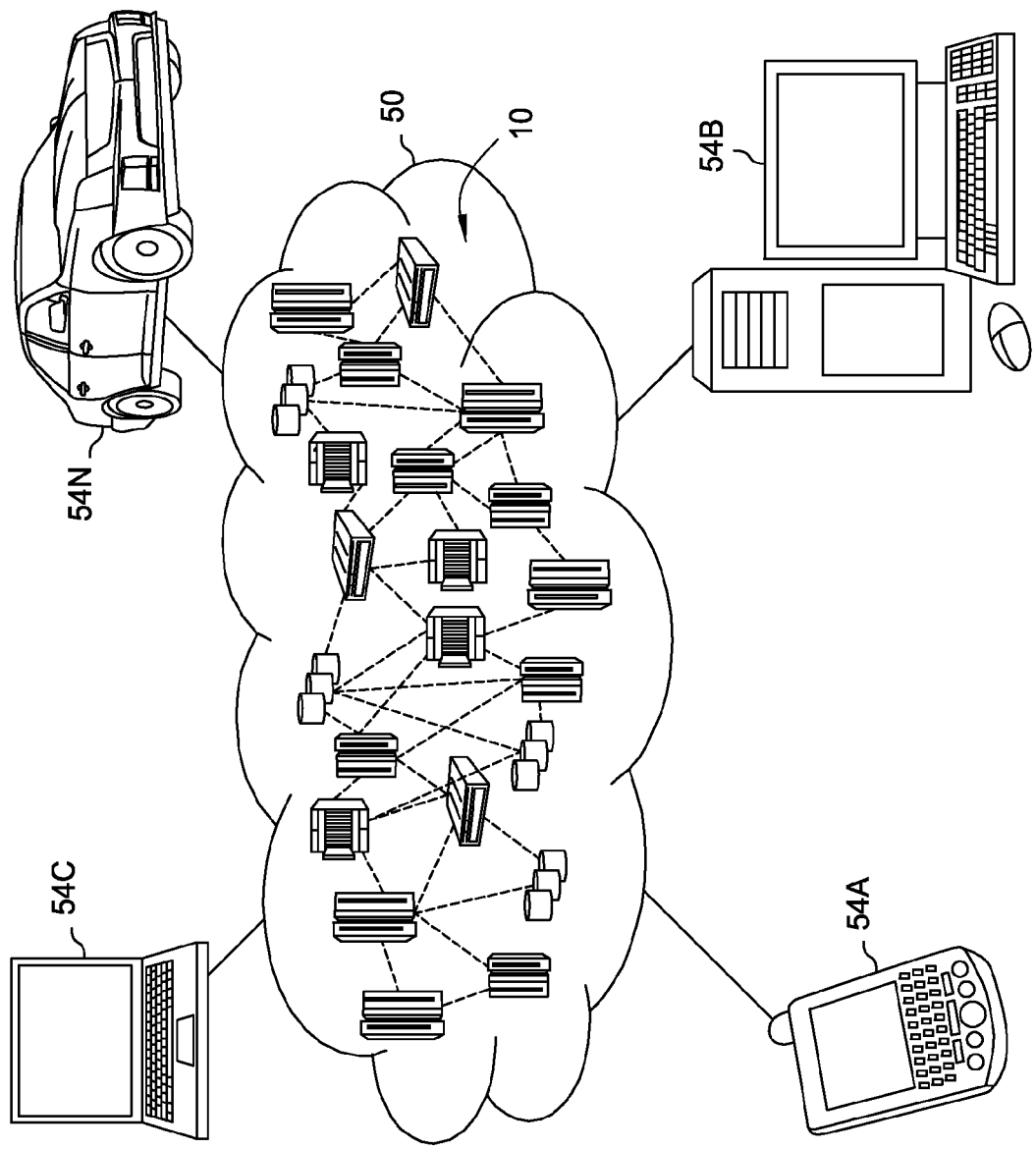
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
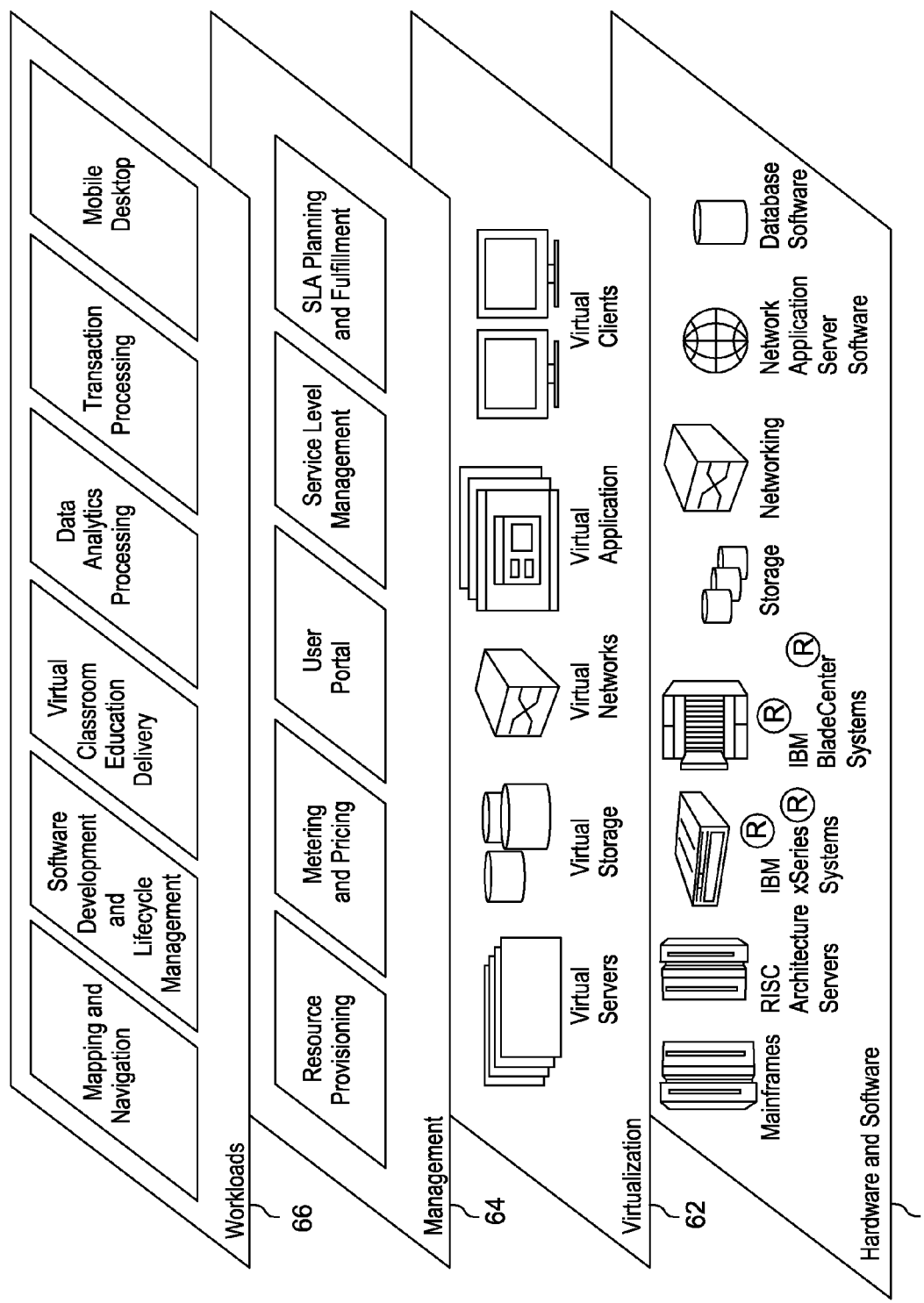
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
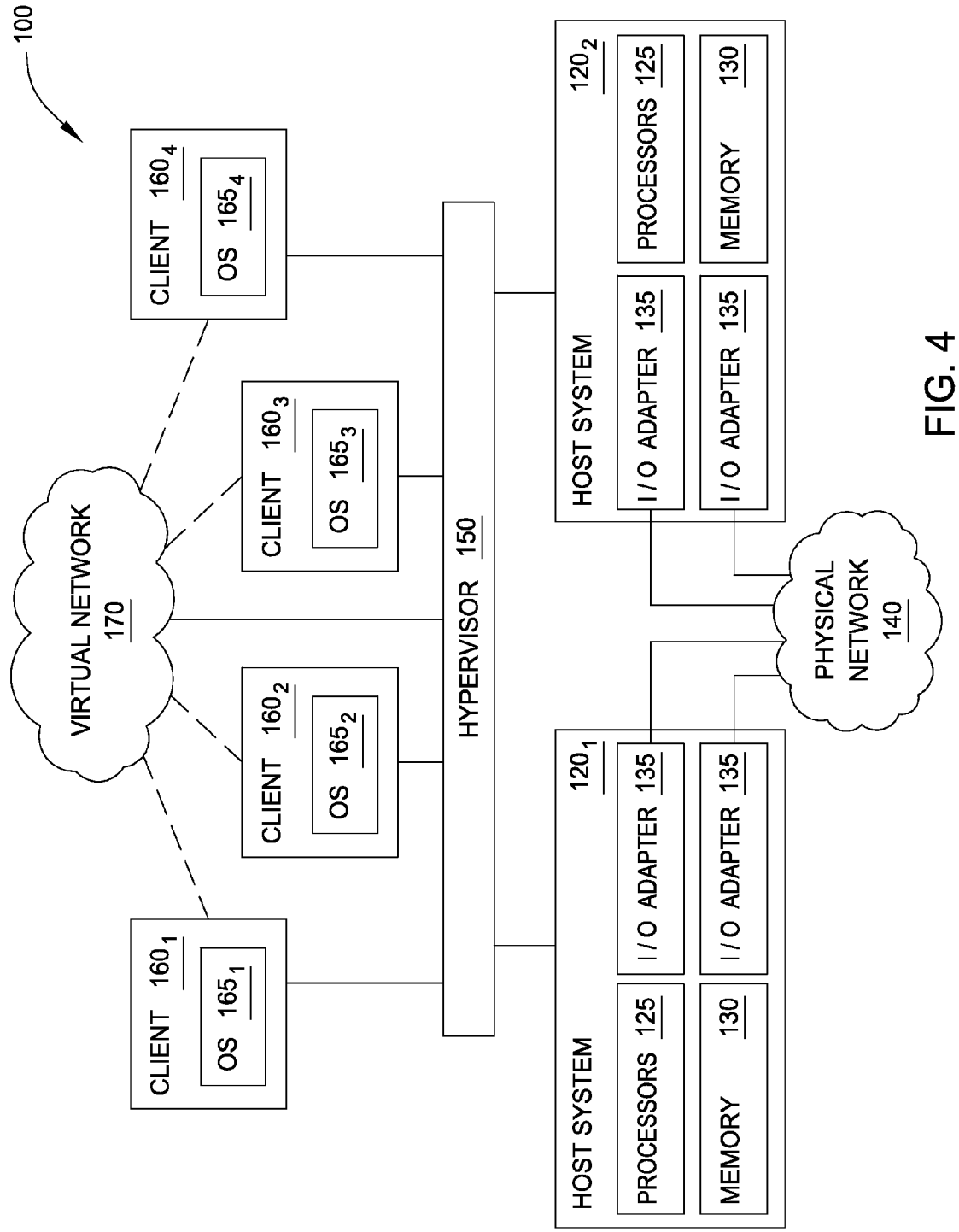
FIG. 4 illustrates an example computing environment, according to one embodiment.

FIG. 4 illustrates an example computing environment, according to one embodiment. Computing environment 100 may generally be used to implement the techniques for packet encapsulation and transmission described herein.

Computing environment 100 generally includes one or more host systems 120 coupled through a physical network 140, and one or more clients 160 which are coupled through a virtual network 170. Host systems $120_1$, $120_2$ may generally include any general purpose or special purpose computing system, and may generally operate at the hardware/software layer 60 described above. And like the description of computer system/server 12 above, examples of well-known computing systems that may be suitable for use as host systems 120 include, but are not limited to, personal computer systems, server computer systems, thin or thick clients, hand-held, mobile, or laptop devices, multiprocessor systems, microprocessor-based systems, set top boxes, programmable consumer electronics, network PCs, minicomputer systems, mainframe computer systems, and so forth. As shown, each host system 120 includes several components, such as one or more processors 125, memory 130, and one or more input/output (I/O) adapters 135.

Processors 125 may include any processing element capable of performing the functions described herein. While depicted as a single element within a host system 120, processors 125 are intended to represent a single processor, multiple processors, a processor or processors having multiple cores, as well as combinations thereof. The memory 130 may include a variety of computer readable media selected for relative performance or other capabilities: volatile and/or non-volatile media, removable and/or non-removable media, etc. Memory 130 may include cache, random access memory (RAM), storage, etc. Memory 130 may include one or more discrete memory modules, such as dynamic RAM (DRAM) dual inline memory modules (DIMMs). Of course, various memory chips, bandwidths, and form factors may alternately be selected. Storage may typically provide a non-volatile memory for the host system 120, and may include one or more different storage elements such as Flash memory, a hard disk drive, a solid state drive, an optical storage device, and/or a magnetic storage device.

The host systems 120 may communicate with other devices, such as peripheral devices or other networked computing devices, using one or more I/O interfaces. To communicate over physical network 140, the host systems 120 may each include one or more I/O adapters 135. Physical network 140 may include one or more networks of various types, including a local area or local access network (LAN), a general wide area network (WAN), and/or a public network (e.g., the Internet).

The host systems 120 may generally provide computing resources (such as processing and memory) to virtualization layer 62 that may be allocated among one or more client devices 160 (also generally referred to as virtual machines (VMs) or logical partitions). A hypervisor 150 may be included to actively manage the distribution and utilization of virtualized hardware resources. Hypervisor 150 may be included as part of one of the host systems 120 (e.g., a firmware module), or may be a separate networked computing device. As shown, several client devices $160_{1-4}$ are operating using the computing resources provided by the networked host systems 120. Of course, the number of client devices 160 and the corresponding hardware configurations may vary. Each of the client devices $160_{1-4}$ may execute a corresponding operating system $165_{1-4}$ as well as various applications or software.

The client devices 160 may be interconnected through a virtual network 170 that does not provide tangible physical connections between the virtual client devices. Hypervisor 150 may actively control the configuration of virtual network 170, routing traffic to and from client devices 160 through various virtual networking components (e.g., switches, routers, firewalls) to provide network segmentation, data isolation, etc.

Figure 5:
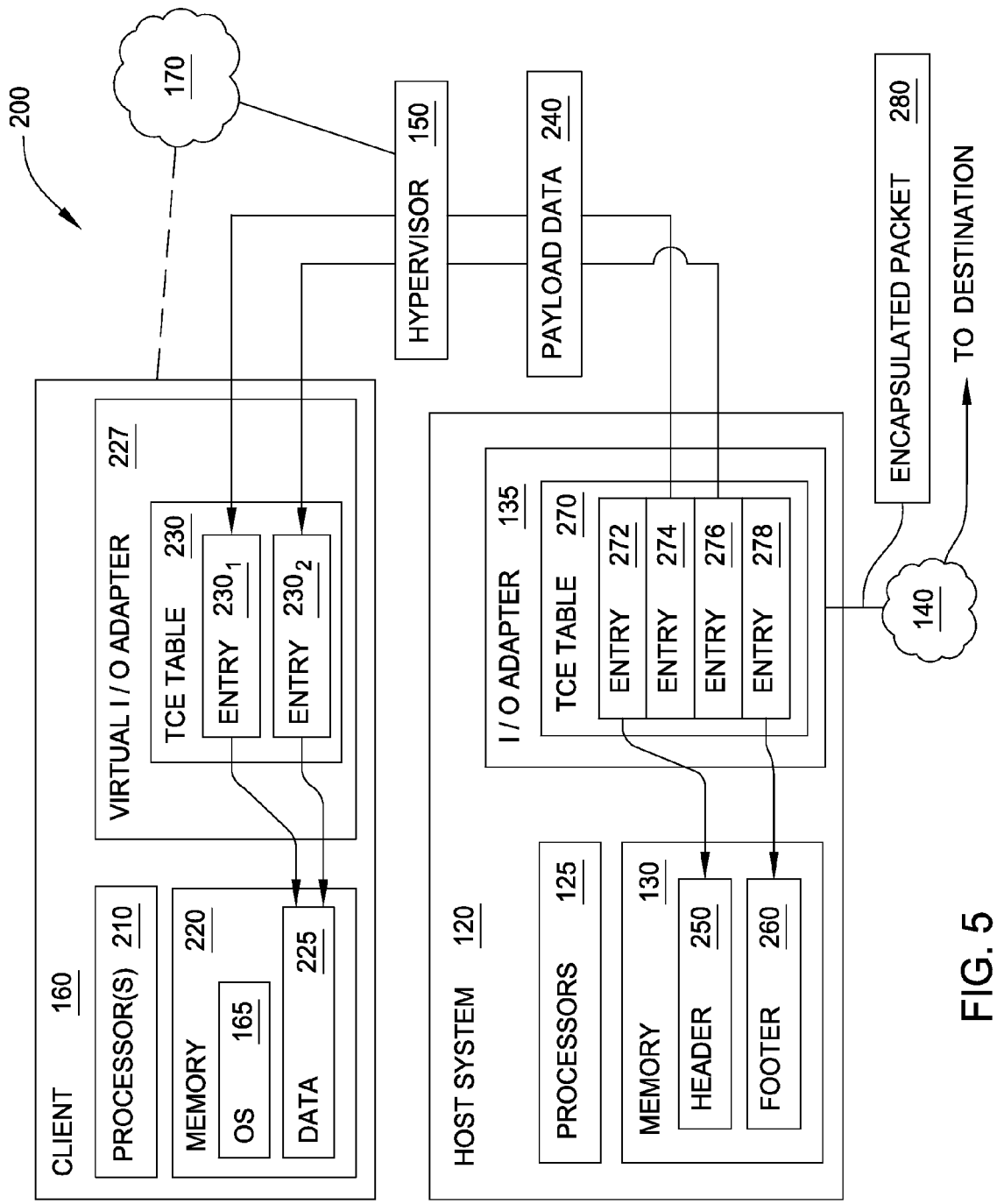
FIG. 5 illustrates encapsulation and transmission of data from a virtual client, according to one embodiment.

FIG. 5 illustrates encapsulation and transmission of data from a virtual client, according to one embodiment. Generally, the computing environment 200 may include similar components and may generally operate similar to the computing environment 100 described above.

Computing environment 200 includes a client device 160 coupled to a virtual network 170, as well as a host system 120 coupled to a physical network 140. Client device 160 includes one or more processors 210 and memory 220 that are allocated from virtualized computing resources, which may provided by host system 120 and/or other networked host systems.

As shown, sending client device 160 transmits data to a destination virtual client. In order to send data between virtual clients on virtual network 170, the data must physically transit the physical network 140 to a destination host device that provides virtualized input/output services to the destination virtual client. To accomplish this, the host system 120 includes a physical I/O adapter 135, such as a network interface card, that is generally configured to send and receive data from physical network 140. I/O adapter 135 includes a translation control entry (TCE) table 270, which allows the I/O adapter 135 to direct-memory access (DMA) portions of memory 130 to be transmitted out to the physical network 140. Each TCE included in TCE table 270 may correspond to a respective I/O buffer page located in memory 130, and each TCE may provide address translation to facilitate the DMA of the corresponding portion of memory 130 by I/O adapter 135.

Conventionally, in order to send data from a client device 160 through a virtual network 170, the host system 120 would first perform a remote DMA of the data, and copy the payload data from client memory 220 into host memory 130. The host system 120 may create the header and/or footer data to accompany the payload data with the packet, also storing the header/footer data in memory 130. The header/footer data generally includes information about the routing of the packet over the physical network 140. Then, the host system 120 maps the portions of memory 130 containing payload data and header/footer data onto particular TCEs in the TCE table 270 and sends a request for the I/O adapter 135 to send the packet. However, copying the data to the host system 120 requires additional time and processing cycles to complete and generally adds to network latency. Copying the payload data also requires the host system 120 reserve a larger amount of memory 130 allocated for storing the payload data, which is thus unavailable for other uses, while the I/O adapter 135 processes the request to send the data packet. In the aggregate, the effect may be more pronounced, as a number of packets from various client devices may be queued to be sent by the I/O adapter 135 over the physical network 140.

In one embodiment, the host system 120 may encapsulate and transmit the packet from I/O adapter 135 using redirected TCEs from the (sending) client device 160. The client device 160 may be configured to operate within the virtual network 170 and may be entirely unaware of the underlying physical network and its particular configuration (e.g., physical nodes or routes through physical network 140). Client device 160 may include a virtual I/O adapter 227 that provides functionality in the virtualized computing space that is analogous to physical I/O adapter 135. As shown, virtual I/O adapter 227 includes a TCE table 230. The hypervisor 150 may bridge the gap to allow DMAs to occur between the virtual and physical computing domains, translating addresses between the TCEs of tables 230 and 270 and otherwise managing the data transfers.

To encapsulate and transmit data from client device 160 using redirected TCEs, the host system 120 maps the portion of data 225 stored in client memory 130 that corresponds to the payload data onto the TCE table 270 of I/O adapter 135. While the physical I/O adapter 135 is likely unable to directly access the TCE table 230 of a virtual client device, the hypervisor 150 may readily access the TCE table 230 to provide the entries to the I/O adapter 135. TCEs from the virtual I/O adapter 227 may contain additional data to help manage mappings for the host systems, causing these TCEs to be larger than standard TCEs accessed by hardware. The hypervisor 150 may be able to access and process this additional data, while appropriately truncating the data when entering the virtual TCEs onto the TCE table 270 of physical adapter 135. As shown, the payload data 240 is represented by two TCEs $230_1$, $230_2$, which are written to TCEs 274, 276 of the I/O adapter 135.

As in the conventional example, the host system 120 may still generate the header/footer data to accompany the payload data 240 with the packet. As shown, header data 250 and footer data 260 are generated and mapped onto the TCE table 270 as entries 272 and 278, respectively.

The hypervisor 150 and/or host system 120 may arrange the TCEs (standard and redirected) within TCE table 270 for subsequent transmission onto the physical network 140. For example, the I/O adapter 135 may transmit the data packet in a header-payload-footer sequence. The corresponding arrangement in TCE table 270 may thus be TCE 272 (standard TCE pointing to header data 250), TCEs 274 and 276 (which the hypervisor 150 derived from TCEs $230_1$, $230_2$ pointing to payload data 240), then TCE 278 (standard TCE pointing to footer data 260).

The host system 120 issues the request to the I/O adapter 135 to transmit the (now assembled) packet. After the packet has been processed by the I/O adapter 135, sent onto the physical network 140 as encapsulated packet 280, the host system 120 may remove the TCEs (standard and/or redirected) from TCE table 270. Alternately, the host system may leave the TCEs in place to be used after receiving a packet from the physical network 140.

Figure 6:
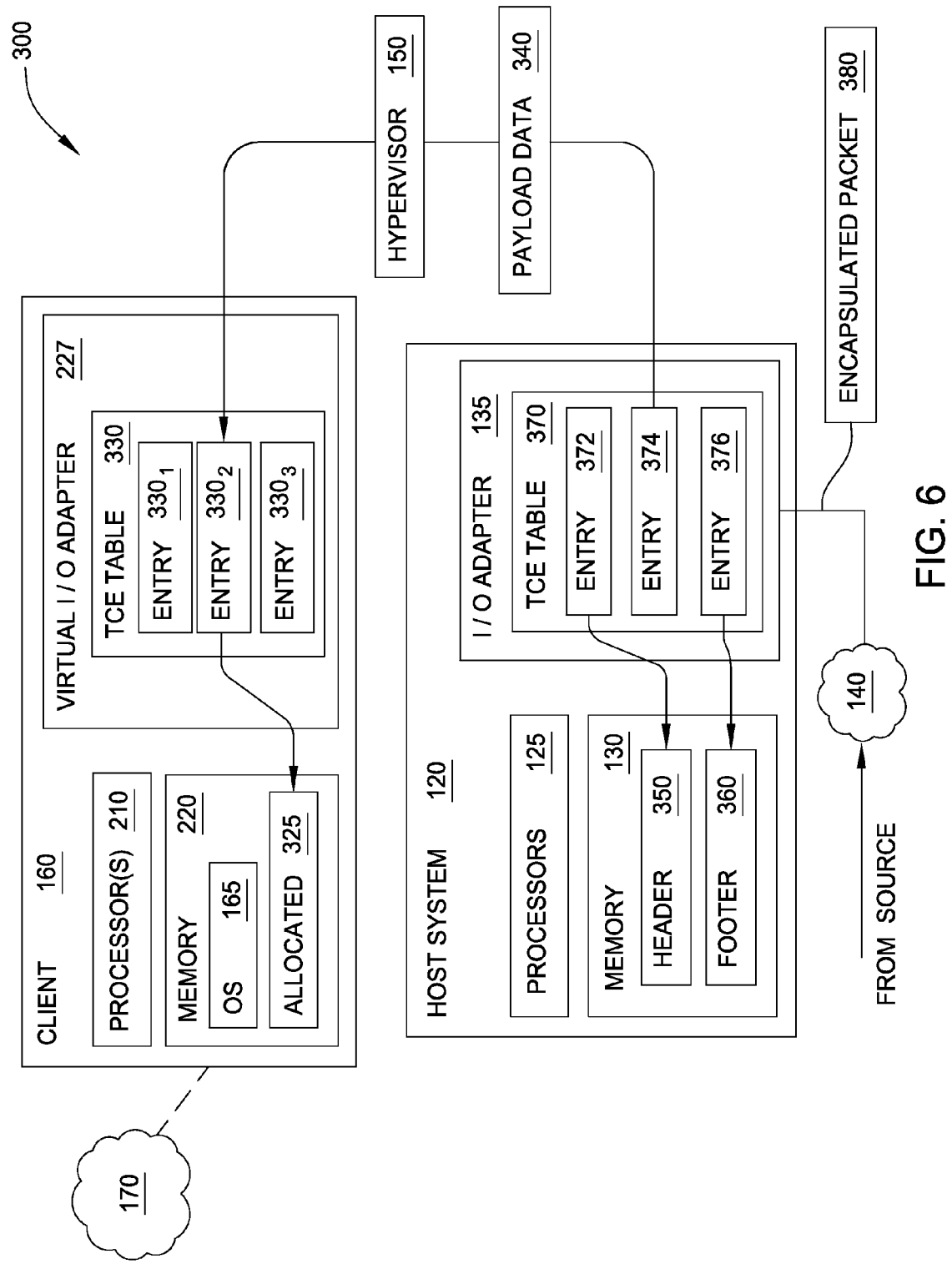
FIG. 6 illustrates the receiving and processing of encapsulated data from a virtual client, according to one embodiment.

FIG. 6 illustrates an example of processing encapsulated data received from a virtual client, according to one embodiment. Generally, the computing environment 300 may include similar components and may generally operate the same or similar to the computing environment 100 described above.

Computing environment 300 includes a client device 160 coupled to a virtual network 170, as well as a host system 120 coupled to a physical network 140. Client device 160 includes one or more processors 210 and memory 220 that are allocated from virtualized computing resources, which may provided by host system 120 and/or other networked host systems.

As shown, the host system 120 receives an encapsulated packet 380 over physical network 140. Conventionally, the host system 120 might copy the entire packet over to its local memory 130 using TCE table 370, process the packet to determine the destination for the payload data 340, and perform a subsequent DMA operation to send the payload data 340 to the destination client device 160.

In one embodiment, the TCE tables 330, 370 may be used to DMA the payload data 340 to client device 160 upon receiving the packet, avoiding an intermediate step of copying the entire packet onto local memory 130 of host system 120. The host system 120 includes one or more entries from TCE table 370 that are mapped to entries on the TCE table 330 of virtual I/O adapter 227. The redirected entries (i.e., entries from the virtual client device that are mapped into the physical I/O adapter) may be actively managed by hypervisor 150, and as described above. The TCE table 370 may also include one or more entries corresponding to header and/or footer data, which may be mapped to the local memory 130 of the host system 120. In this manner, the header and footer may be stripped from the incoming packet, with only the payload data being transmitted to the client device 160.

The I/O adapter 135 may notify the host system 120 upon receipt of an incoming packet. The I/O adapter 135 may use standard TCEs (such as entries 372, 376) to DMA header and/or footer data from the incoming packet to the memory 130, and may use the redirected TCEs from the client device 160 (such as entry 374, which points to entry $330_2$) to send packet payload data 340 into the allocated portion 325 of memory 220. Following this processing of the incoming packet by the I/O adapter 135, the host system 120 may remove or update the TCEs (whether standard or redirected) from TCE table 370. Alternatively, the host system may leave the TCEs in place to be used for a subsequent transmission from the client device 160 onto the physical network 140.

FIG. 7 illustrates a method for encapsulating and transmitting a packet within a virtualized network, according to one embodiment. The method 400 may be generally used in computing environments 100, 200, 300 discussed above to send data between virtual client devices, such as VMs.

Method 400 begins at block 405, where one or more first TCEs from the TCE table of a client device are written to the TCE table of a host system. The first TCEs may map to payload data to be sent onto the physical network, and may be written to a TCE table of a physical I/O adapter that is "owned" by the host system. The physical I/O adapter may subsequently DMA the locations indicated by the first TCEs to send the client device data onto the physical network. As discussed above, a hypervisor may provide the address translation and management for the "redirected" TCEs in order to allow DMAs to occur between physical and virtual computing domains.

At block 415, one or more second TCEs are written to the TCE table of the host system. The second TCEs may map to header/footer data generated by the host system to accompany the payload data in the encapsulated packet. Block 415 may also include arranging the TCEs within the TCE table of the physical I/O adapter in an order suitable for transmission on the physical network.

At block 425, the encapsulated packet is transmitted from the I/O adapter of the host system using the payload data indicated by the first TCEs, and header/footer information indicated by the second TCEs. As part of this block, the I/O adapter may perform DMAs of the host system memory, as well as the client memory (through a hypervisor). The method ends following completion of block 425.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-readable device containing a program which, when executed by one or more computer processors, performs an operation for encapsulating a packet for transmission through within a virtualized network, the operation comprising:
   writing one or more first translation control entries (TCEs) from a client TCE table of a client system to a host TCE table of a host system providing at least a portion of computing resources of the client system, wherein the first TCEs indicate a location within the client system of payload data for to be included within the packet, wherein the client TCE table corresponds to a virtual input/output (I/O) adapter of the client system and the host TCE table corresponds to a physical I/O adapter of the host system; and
   writing one or more second TCEs to the host TCE table of the host system, wherein the second TCEs indicate a location within the host system of at least one of header and footer information to be included with the payload data within the packet;
   writing one or more third TCEs to the host TCE table, wherein the third TCEs indicate a location within the client system for corresponding payload data to be sent when a subsequent encapsulated packet is received; and
   writing one or more fourth TCEs to the host TCE table, wherein the fourth TCEs indicate a location within the host system for at least one of corresponding header and footer information to be sent when the subsequent encapsulated packet is received.

2. The computer-readable device of claim 1, wherein the first TCEs and the second TCEs are arranged written to the host TCE table in an order for transmission of the packet using the physical I/O adapter onto a physical network.

3. The computer-readable device of claim 1, wherein the operation further comprises:
   generating, based on the payload data, the at least one of header and footer information on the host system.

4. The computer-readable device of claim 1, wherein the operation further comprises:
   receiving an the encapsulated packet at the physical I/O adapter of the host system; and
   sending payload data included in the encapsulated packet to a virtual I/O adapter of a destination client system having at least a portion of its computing resources provided by the host system.

5. The computer-readable device of claim 1, wherein the writing of the one or more first TCEs to the host TCE table of the host system is performed by a hypervisor configured to manage a distribution of computing resources of the host system.

6. The computer-readable device of claim 5, wherein the hypervisor is configured to manage a distribution of computing resources of one or more other host systems.

7. The computer-readable device of claim 5, wherein the hypervisor is included within the host system.

8. The computer-readable device of claim 1, wherein the physical I/O adapter of the host system comprises a network interface card.

9. The computer-readable device of claim 1, wherein a first size of the first TCEs differs from a second size of the second TCEs.

10. The computer-readable device of claim 9, wherein the first size is greater than the second size, and wherein writing the one or more first TCEs from to the host TCE table comprises truncating the first TCEs.

11. The computer-readable device of claim 10, wherein the first TCEs and the second TCEs are arranged in the host TCE table such that the packet comprises one or more standard-sized TCEs, one or more truncated TCEs, and one or more other standard-sized TCEs.

12. The computer-readable device of claim 1, the operation further comprising:
   transmitting, from the physical I/O adapter of the host system, the packet onto a physical network without copying the payload data onto a local memory of the host system.

13. A system, comprising:
   a host system coupled to a physical network;
   a client system using a virtualized computing resource provided by the host system; and
   a computer-readable device containing a program configured to encapsulate a packet by performing an operation, comprising:
   writing one or more first translation control entries (TCEs) from a client TCE table of the client system to a host TCE table of the host system providing at least a portion of computing resources of the client system, wherein the first TCEs indicate a location within the client system of payload data for to be included within the packet, wherein the client TCE table corresponds to a virtual input/output (I/O) adapter of the client system and the host TCE table corresponds to a physical I/O adapter of the host system; and
   writing one or more second TCEs to the host TCE table of the host system, wherein the second TCEs indicate a location within the host system of at least one of header and footer information to be included with the payload data within the packet;
   writing one or more third TCEs to the host TCE table, wherein the third TCEs indicate a location within the client system for corresponding payload data to be sent when a subsequent encapsulated packet is received; and
   writing one or more fourth TCEs to the host TCE table, wherein the fourth TCEs indicate a location within the host system for at least one of corresponding header and footer information to be sent when the subsequent encapsulated packet is received.

14. The system of claim 13, wherein the first TCEs and the second TCEs are arranged written to the host TCE table in an order for transmission of the packet using the physical I/O adapter onto the physical network.

15. The system of claim 13, wherein the host system is configured to:
   receive an the encapsulated packet at the physical I/O adapter of the host system; and
   send payload data included in the encapsulated packet to a virtual I/O adapter of a destination client system having at least a portion of its computing resources provided by the host system.

16. The system of claim 13, wherein the writing of the one or more first TCEs to the host TCE table of the host system is performed by a hypervisor configured to manage a distribution of computing resources of the host system.

17. A computer-readable device containing a program which, when executed by one or more computer processors, performs an operation for transmitting a packet within a virtualized network, the operation comprising:

writing one or more first translation control entries (TCEs) from a client TCE table of a client system to a host TCE table of a host system providing at least a portion of computing resources of the client system, wherein the first TCEs indicate a location within the client system of payload data to be included within the packet;

writing one or more second TCEs to the host TCE table, wherein the second TCEs indicate a location within the host system of at least one of header and footer information to be included with the payload data within the packet; and transmitting, from the host system, the packet onto a physical network without copying the payload data onto a local memory of the host system.

18. The computer-readable device of claim 17, wherein the client TCE table corresponds to a virtual input/output (I/O) adapter of the client system, and the host TCE table corresponds to a physical I/O adapter of the host system coupled with the physical network.

19. The computer-readable device of claim 18, wherein the first TCEs and the second TCEs are written to the host TCE table in an order for transmission of the packet using the physical I/O adapter.

20. The computer-readable device of claim 17, the operation further comprising:

receiving a subsequent encapsulated packet at the physical I/O adapter of the host system; and sending payload data included in the subsequent encapsulated packet to a virtual I/O adapter of a destination client system having at least a portion of its computing resources provided by the host system.

\* \* \* \* \*